US011825059B2

(12) United States Patent
Tokunaga et al.

(10) Patent No.: US 11,825,059 B2
(45) Date of Patent: Nov. 21, 2023

(54) INFORMATION PROCESSING DEVICE, CONTROL METHOD, AND RECORDING MEDIUM STORING PROGRAM

(71) Applicant: SHARP KABUSHIKI KAISHA, Sakai (JP)

(72) Inventors: Shingo Tokunaga, Sakai (JP); Tatsuya Watabe, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 136 days.

(21) Appl. No.: 17/467,983

(22) Filed: Sep. 7, 2021

(65) Prior Publication Data

US 2022/0103718 A1 Mar. 31, 2022

(30) Foreign Application Priority Data

Sep. 28, 2020 (JP) ................................ 2020-162668

(51) Int. Cl.
*G06F 21/00* (2013.01)
*H04N 1/44* (2006.01)
*H04N 1/00* (2006.01)
*G06F 21/84* (2013.01)
*G06F 21/62* (2013.01)
*G06F 21/60* (2013.01)

(52) U.S. Cl.
CPC ......... *H04N 1/4493* (2013.01); *G06F 21/629* (2013.01); *G06F 21/84* (2013.01); *H04N 1/00411* (2013.01); *H04N 1/4433* (2013.01); *G06F 21/606* (2013.01); *H04N 1/4406* (2013.01)

(58) Field of Classification Search
None
See application file for complete search history.

(56) References Cited

U.S. PATENT DOCUMENTS

| 8,161,395 | B2* | 4/2012 | Girgaonkar | ......... G06F 3/04895 |
| | | | | 715/741 |
| 8,601,370 | B2* | 12/2013 | Chiang | .................. G06F 3/0482 |
| | | | | 715/700 |
| 10,049,227 | B1* | 8/2018 | Sampson | ............ G06F 21/6218 |
| 2016/0232880 | A1* | 8/2016 | Arat | ....................... G06F 3/1454 |
| 2016/0378961 | A1* | 12/2016 | Park | ........................ G06F 21/36 |
| | | | | 726/19 |
| 2019/0050600 | A1* | 2/2019 | Sahoo | ................. G06F 21/6281 |

FOREIGN PATENT DOCUMENTS

| JP | 2009-044349 A | 2/2009 |
| JP | 2009-223862 A | 10/2009 |

\* cited by examiner

*Primary Examiner* — Maung T Lwin
(74) *Attorney, Agent, or Firm* — ScienBiziP, P.C.

(57) ABSTRACT

The present invention includes a receiver capable of receiving confidential data, a screen display controller that performs a control that displays a screen in which the confidential data received by the receiver is in a masked display, a determiner that determines whether or not an identification display for visualizing the confidential data in the masked display is to be displayed, and an identification display controller that performs a control that displays the identification display on the screen when it is determined by the determiner that the identification display is to be displayed.

8 Claims, 10 Drawing Sheets

| SERVER NAME | LOGIN NAME | PASSWORD |
|---|---|---|
| mail1.example.com | mail1 | aaaaaaaa |
| mail2.example.com | mail2 | bbbbbbbb |
| mail3.exmpale.com | mail3 | cccc1234 |
| ⋮ | ⋮ | ⋮ |

W110 https://192.168.1.100/setting/mail-server.html

SERVER NAME:

mail1.example.com

LOGIN NAME:

mail1

PASSWORD:

W120 https://192.168.1.100/setting/mail-server.html

SERVER NAME:

mail1.example.com

LOGIN NAME:

mail1

PASSWORD:

aaaaaaaa 👁

E120
B120

INFORMATION PROCESSING DEVICE, CONTROL METHOD, AND RECORDING MEDIUM STORING PROGRAM

BACKGROUND OF THE INVENTION

Field of the Invention

The present disclosure relates to an information processing device.

Description of the Background Art

Conventionally, a technique that sets the system settings of an image forming device using an external device such as a PC (personal computer) is being used, and a technique for ensuring security at that time has also been proposed.

For example, a technique has been proposed for an image forming device in which it is determined whether or not a setting change is to be accepted based on whether or not the request has been received via an administration protocol having a security function (for example, see Japanese Unexamined Patent Application Publication No. 2009-223862). Furthermore, a technique has been proposed for a system in which an image forming device and a mobile terminal are connected by a network, such that when the mobile terminal is used as an external display device of the image forming device, the password is displayed during password input when the password is input from the screen of the mobile terminal, and the password is not displayed when the password is input from the operation screen of the main unit (for example, see Japanese Unexamined Patent Application Publication No. 2009-44349).

SUMMARY OF THE INVENTION

When the system settings of an image forming device are set using an external device such as a PC (personal computer), data which is to be kept confidential from a third party (confidential data), such as a password, is entirely displayed as asterisks (*), black circles (●), and the like. Such a display is generally referred to as a masked display. A masked display prevents the contents of confidential data from being observed by the user or a third party. However, the user is unable to confirm which characters have been input when the password or the like is input. Furthermore, the contents of the confidential data cannot be reconfirmed after being set.

On the other hand, there is a technique that provides an icon for visualizing the confidential data. However, in order to visualize the confidential data, the confidential data needs to be transmitted from the image forming device to a terminal device such as a PC. Here, if an attacker is monitoring the communication path, there is a risk that the data being communicated may be intercepted due to the acquisition of network packets or leaks from a proxy. At this time, if the communication path is not secure, such as when the confidential data is not encrypted or the encryption strength is weak and can be easily decrypted, the confidential data may be leaked and decrypted.

Therefore, it is necessary for confidential data to be transmitted and received based on a state that represents whether or not the communication path is secure, and for confidential data to be appropriately visualized in a terminal device such as a PC. A technique that solves such a problem is not disclosed in Japanese Unexamined Patent Application Publication No. 2009-223862 or Japanese Unexamined Patent Application Publication No. 2009-44349.

In view of the problem described above, the present disclosure has an object of providing an information processing device and the like that appropriately displays a display button that removes a masked display of the data received via a secure communication.

A first aspect for solving the above problem is an information processing device including: a communication device that transmits and receives data via a communication path; a display device; and a controller; wherein the controller generates a masked display on the display device based on data received via the communication device, displays a display button on the display device when the data is received via a secure communication path, and removes the masked display of the data and displays the data on the display device when the display button is selected.

A second aspect for solving the above problem is a control method of an information processing device including a communication device that transmits and receives data via a communication path, and a display device, the method including: generating a masked display on the display device based on data received via the communication device; displaying a display button on the display device when the data is received via a secure communication path; and removing the masked display of the data and displaying the data on the display device when the display button is selected.

A third aspect for solving the above problem is a non-transitory recording medium storing a program that causes a computer of an information processing device including a communication device that transmits and receives data via a communication path, and a display device, to realize the functions of: generating a masked display on the display device based on data received via the communication device; displaying a display button on the display device when the data is received via a secure communication path; and removing the masked display of the data and displaying the data on the display device when the display button is selected.

According to the present disclosure, the present disclosure enables a display button which removes a masked display of the data received via a secure communication to be appropriately displayed.

DESCRIPTION OF THE PREFERRED EMBODIMENTS

Hereinafter, embodiments for carrying out the present disclosure will be described with reference to the drawings. Note that the following embodiments are examples for describing the present disclosure. The technical scope of the invention described in the claims is not limited to the description below.

1. First Embodiment

1.1 Overall Configuration

Figure 1:
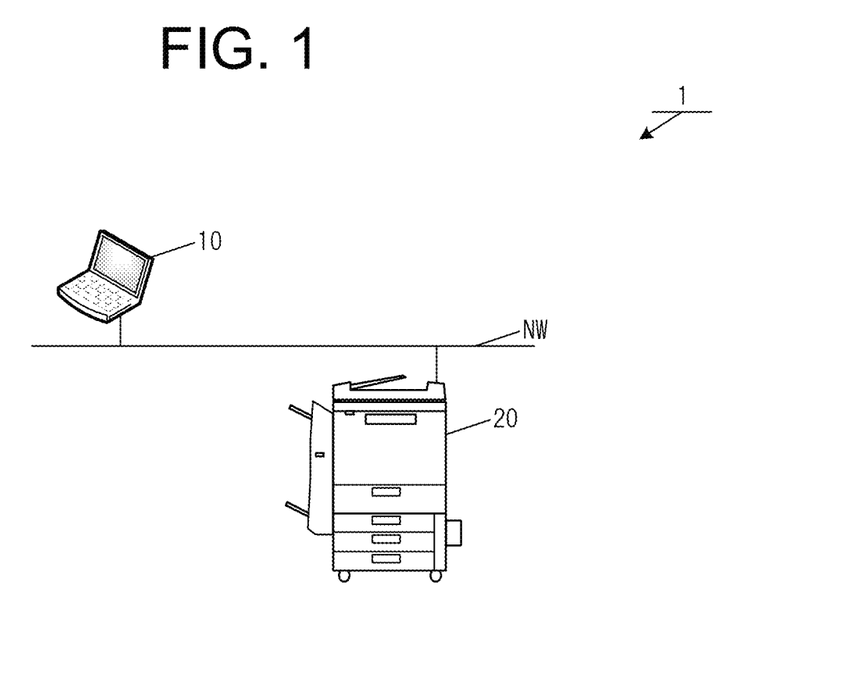
FIG. 1 is a diagram for describing an overall configuration of a first embodiment.

The overall configuration of a system 1 of the present embodiment will be described based on FIG. 1. As shown in FIG. 1, in the system 1, a terminal device 10 and an image forming device 20 are connected via a network NW. In the present embodiment, the network NW will be described as being a network such as a LAN (Local Area Network). However, it may be a network other than a LAN (for example, an external network such as the Internet) as long as the devices are capable of exchanging data with each other.

The terminal device 10 is an information processing device constituted by, for example, a smartphone, a tablet, a PC (Personal Computer), or the like.

The image forming device 20 is a printing device (printer) that outputs (prints) an image by forming the image on a recording medium (such as a recording sheet).

1.2 Functional Configuration

Figure 2:
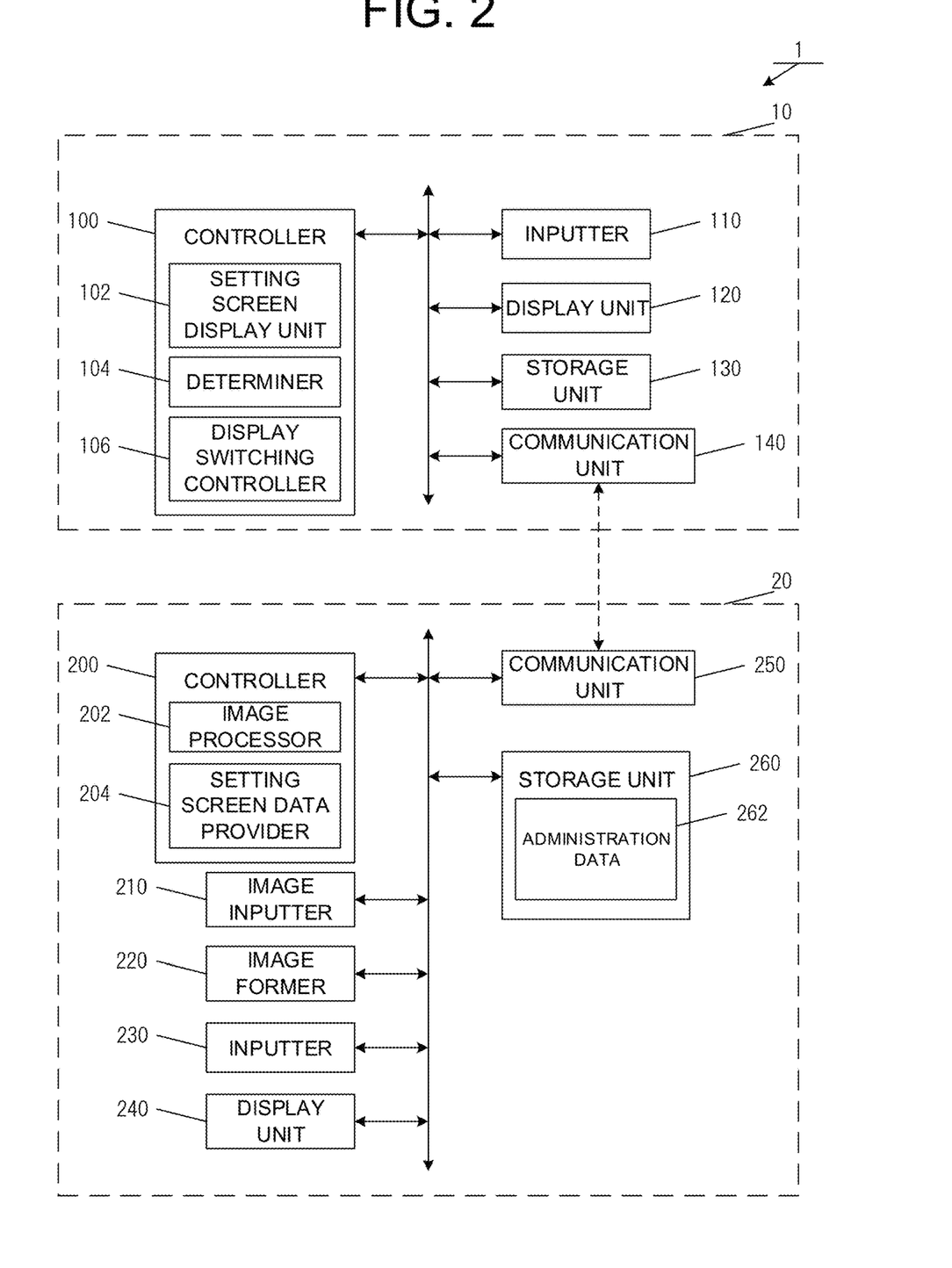
FIG. 2 is a diagram for describing a functional configuration of the first embodiment.

Next, the functional configuration of the terminal device 10 and the image forming device 20 constituting the system 1 will be described with reference to FIG. 2. As shown in FIG. 2, the terminal device 10 and the image forming device 20 are connected via a communication unit 140 and a communication unit 250.

1.2.1 Terminal Device

The terminal device 10 includes a controller 100, an inputter 110, a display unit 120, a storage unit 130, and a communication unit 140.

The controller 100 is a functional unit for controlling the terminal device 10 as a whole. The controller 100 realizes various functions by reading and executing various programs stored in the storage unit 130, and is constituted by one or more computation devices (for example, a CPU (Central Processing Unit)).

The inputter 110 is a functional unit for accepting operations from a user who is using the terminal device 10. The inputter 110 is constituted by various operation devices such as a mouse and a keyboard, or an input device that detects touch inputs. The method of detecting touch inputs may be a general detection method such as a resistance film method, an infrared method, an electromagnetic induction method, or a capacitance method.

The display unit 120 is a functional unit for displaying various information, and is constituted by a display device such as an LCD (Liquid crystal display), an organic EL (electro-luminescence) display, or a micro-LED (Light Emitting Diode) display.

The terminal device 10 may include a touch panel in which the inputter 110 and the display unit 120 are integrally formed.

The storage unit 130 is a functional unit that stores various programs and various data required for operation of the terminal device 10. The storage unit 130 is configured by a storage device such as an SSD (Solid State Drive), which is a semiconductor memory, or an HDD (Hard Disk Drive).

The communication unit 140 is a functional unit for the terminal device 10 to perform data communication with an external device such as the image forming device 20 via a network (communication path). The communication unit 140 is constituted by a communication device such as an NIC (Network Interface Card) used in a wired/wireless LAN, or a communication module which is capable of connecting to an LTE (Long Term Evolution)/LTE-A (LTE-Advanced)/LAA (License-Assisted Access using LTE)/5G line.

The controller 100 functions as a setting screen display unit 102, a determiner 104, and a display switching controller 106 as a result of executing a program.

The setting screen display unit 102 displays a setting screen of the image forming device 20 on the display unit 120. The setting screen display unit 102 may be realized, for example, by executing a dedicated application, or may be realized by a web browser. The setting screen may be configured, for example, as a webpage or as an application screen.

The setting screen display unit 102 transmits a request to the image forming device 20 to acquire the data required to display the setting screen (setting screen request). Furthermore, the setting screen display unit 102 receives the data (setting screen data) required to display the setting screen from the image forming device 20 as a response to the request. The setting screen data includes layout data used for configuring the setting screen. The setting screen display unit 102 displays a setting screen in which predetermined display elements are arranged in predetermined positions based on the layout data. The display elements include components (controls and widgets) of a GUI (Graphical User Interface) such as text boxes, labels, and buttons.

Furthermore, the setting screen data includes setting value data for each setting item. For each setting item, the setting screen display unit 102 sets the setting value data that corresponds to the setting item to the state that has been input to, or displayed by, a predetermined display element.

A portion of the setting value data received from the image forming device 20 may be confidential data. The confidential data in the present embodiment is data which is to be kept secret from a third party. The confidential data is, for example, data that should be avoided from being leaked even if the data is intercepted during communication as a result of an attacker monitoring the communication path and acquiring network packets or leaks from a proxy. An example of this is a password. The confidential data may be data other than a password, and may be predetermined setting values of the image forming device 20 (including address information such as IP (Internet Protocol) addresses, personal information, and contact information).

Data indicating which of the items have setting value data to be treated as confidential data may be included in the layout data, or may be included as an attribute of the setting value data. If the setting value data includes confidential data, the setting screen display unit 102 sets the confidential data to a state where it is displayed in a masked display. A masked display is a display mode in which an input or displayed data is not visible to the user (not visualized). As an example, a masked display is a display mode in which the characters included in the confidential data are displayed such that each character is replaced with a mask character (for example, a symbol such as an asterisk (*) or circle (●)) which is different from the original character.

The determiner 104 determines whether or not a visualization icon for displaying the data in a masked display is to be displayed on the setting screen.

The visualization icon is an icon for accepting an operation for visualizing confidential data which is in a masked display. An identification display is, for example, a button, label, or switch which is displayed on the side or in the corner of a password setting field of a webpage. In the present embodiment, the description assumes that the visualization icon is a button (display button).

The display switching controller 106 controls the display of the display button, and performs a control that removes the masked display when the display button is selected. For example, when the setting screen includes a display element in which confidential data is input or displayed, the display switching controller 106 displays a display button around or inside the display element.

Furthermore, the display switching controller 106 may remove the masked display of the confidential data and visualize the confidential data while the display button is selected by the user, or until a certain duration elapses after the display button is selected by the user. Furthermore, the display switching controller 106 may display the confidential data in a masked display when the operation of selecting the display button is completed, or after a certain duration has elapsed after the display button is selected by the user.

The display switching controller 106 may switch between a state in which the masked display of the confidential data is removed and a state where the confidential data is displayed in a masked display each time the display button is selected.

1.2.2 Image Forming Device

The image forming device 20 includes a controller 200, an image inputter 210, an image former 220, an inputter 230, a display unit 240, a communication unit 250, and a storage unit 260.

The controller 200 is a functional unit for controlling the image forming device 20 as a whole. The controller 200 realizes various functions by reading and executing various programs stored in the storage unit 260, and is constituted by one or more computation devices (for example, a CPU).

The image inputter 210 inputs image data to the image forming device 20. For example, the image inputter 210 is constituted by a scanner device and the like which is capable of reading an image and generating image data. The scanner device converts an image into an electric signal by means of an image sensor such as a CCD (Charged Coupled Device) or a CIS (Contact Image Sensor), and then generates digital data by quantizing and encoding the electric signal. The image inputter 210 may take image data recorded on recording medium such as a USB (Universal Serial Bus) memory or SD card as input, or may take image data acquired from another device via the communication unit 250 as input.

The image former 220 forms an image on a recording medium (such as recording paper) based on the image data. The image former 220 is constituted by, for example, a laser printer using an electrophotographic method.

The inputter 230 accepts operation instructions from the user. The inputter 230 is constituted by, for example, hardware keys (such as a numeric keypad) or a button. The display unit 240 displays various information to the user. For example, the display unit 240 is constituted by a display device such as an LCD, an organic EL display, or a micro-LED display. The image forming device 20 may include a touch panel in which the inputter 230 and the display unit 240 are integrally formed. The method of detecting inputs may be a general detection method such as a resistance film method, an infrared method, an electromagnetic induction method, or a capacitance method.

The communication unit 250 is a functional unit for the image forming device 20 to perform data communication with an external device such as the terminal device 10 via a network (communication path). The communication unit 250 is constituted by, for example, a communication device such as an NIC used in a wired/wireless LAN.

The storage unit 260 stores various programs and various data required for operation of the image forming device 20. The storage unit 260 is constituted by, for example, a storage device such as an SSD, which is a semiconductor memory, or an HDD.

The storage unit 260 stores administration data 262, which is data that is managed by the image forming device 20. The administration data 262 is, for example, data about another device (such as a mail server or a file server) with which the image forming device 20 communicates, data about the user who is using the image forming device 20, or data which is set to the image forming device 20 (setting information).

Figure 3:
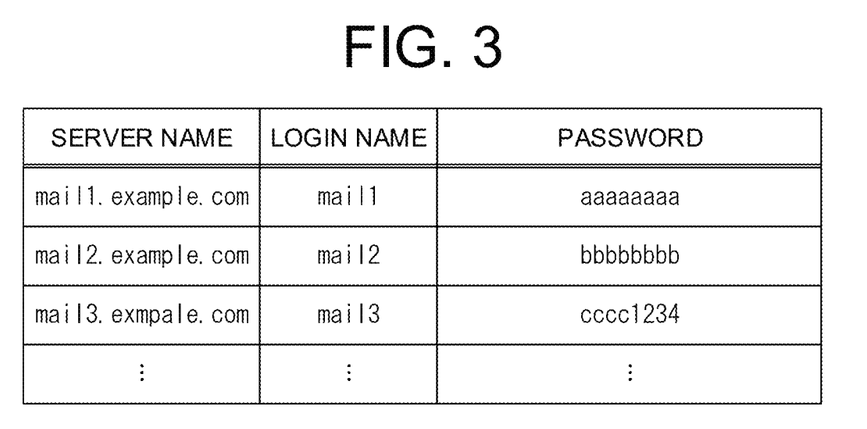
FIG. 3 is a diagram showing an example of a data structure of administration data in the first embodiment.

The present embodiment will be described assuming that mail server data is stored as the administration data 262. For example, as shown in FIG. 3, the administration data 262 stores the server name of a mail server (for example, "maill.example.com"), a login name used to log into the mail server (for example, "main"), and a password (for example, "aaaaaaaa"). The present embodiment will be described assuming the password is confidential data.

The controller 200 functions as an image processor 202 and a setting screen data provider 204 as a result of executing a program.

The image processor 202 is a functional unit that performs various image processing on image data (for example, the image data input by the image inputter 210). For example, the image processor 202 performs sharpening processing and color conversion processing with respect to image data.

The setting screen data provider 204 receives a setting screen request from another device (for example, the terminal device 10), and provides (transmits) setting screen data which includes layout data of the setting screen and data stored in the administration data 262 as a response to the request.

1.3 Processing Flow

The main processing performed by the terminal device 10 of the present embodiment will be described with reference to FIG. 4. First, the controller 100 (setting screen display unit 102) transmits a setting screen request to the image forming device 20 via the communication unit 140 (step S102).

Then, the controller 100 (setting screen display unit 102) receives the setting screen data from the image forming device 20 via the communication unit 140 as a response to the setting screen request (step S104).

Here, in step S104, when the communication path between the terminal device 10 and the image forming device 20 is secure, the controller 100 (setting screen display unit 102) receives setting value data from the image forming device 20 which includes the confidential data. On the other hand, when the communication path between the terminal device 10 and the image forming device 20 is not secure, the controller 100 (setting screen display unit 102) receives setting value data from the image forming device 20 which includes data that substitutes for the confidential data.

The data that substitutes for the confidential data is data which is different from the confidential data. It is data which is used to display a predetermined display in a display element of the setting screen in which the confidential data is input or displayed. The data that substitutes for the confidential data is, for example, a random character string constituted by the same number of characters as the confidential data.

Then, the controller 100 (setting screen display unit 102) generates the setting screen based on the setting screen data received in step S104 (step S106). For example, the controller 100 (setting screen display unit 102) may arrange a text box based on the layout data or set the text box to a state in which setting value data has been input.

Next, the controller 100 (setting screen display unit 102) displays the setting value data that has been input or displayed in the display element which displays the confidential data in a masked display (step S108). As a result, if confidential data has been received in step S104, the controller 100 (setting screen display unit 102) displays the confidential data in a masked display. On the other hand, if data that substitutes for the confidential data has been received in step S104, the controller 100 (setting screen display unit 102) displays the data that substitutes for the confidential data in a masked display.

Then, the controller 100 (setting screen display unit 102) displays the setting screen generated in step S106, with predetermined data displayed in a masked display as a result of step S108, on the display unit 120 (step S110).

Next, the controller 100 (determiner 104) determines whether or not a display button is to be displayed on the setting screen. In the present embodiment, the controller 100 (determiner 104) determines whether or not the communication path between the terminal device 10 and the image forming device 20 is secure (step S112).

The communication path is secure when, for example, HTTPS (Hypertext Transfer Protocol Secure) communication is being performed (TLS (Transport Layer Security) encryption is being applied) between the terminal device 10 and the image forming device 20. On the other hand, the communication path is not secure when HTTP (Hypertext Transfer Protocol) communication is being performed (TLS encryption is not being applied).

The controller 100 (determiner 104) determines whether or not the communication path is secure based on, for example, the scheme name included in the URL (Uniform Resource Locator), or the protocol and port number being used for communication.

If it is determined in step S112 that the communication path is secure, the controller 100 (display switching controller 106) displays a display button around or inside the display element in which data displayed in a masked display has been input or displayed (step S114).

Then, the controller 100 (display switching controller 106) determines whether or not the display button has been selected (step S116). When the display button is selected, the controller 100 (display switching controller 106) removes the masked display of the data displayed in a masked display in step S108 (step S118).

Here, if the communication path is secure, confidential data is received by the controller 100 (setting screen display unit 102) in step S104. Then, the confidential data is displayed in a masked display by the controller 100 (setting screen display unit 102) in step S108. Therefore, in step S118, the confidential data in a masked display has the masked display removed by the controller 100 (display switching controller 106). As a result, the contents of the confidential data are displayed on the setting screen.

The controller 100 (display switching controller 106) redisplays the confidential data in a masked display when the selection of the display button is released, or after a certain time has elapsed from the selection of the display button. Furthermore, the controller 100 (display switching controller 106) may switch between a state in which masked display of the confidential data is removed and a state where the confidential data is displayed in a masked display each time the display button is selected.

Next, the controller 100 (setting screen display unit 102) determines whether or not the setting has been completed (step S120). If the setting is not completed, the controller 100 returns to step S116 (step S120; No→step S116). If the setting has been completed, the controller 100 ends the main processing (step S120; Yes).

If it is determined by the controller 100 (determiner 104) in step S112 that the communication path is not secure, the controller 100 (display switching controller 106) skips (omits) the processing from step S114 to step S118. Therefore, if the communication path is not secure, a display button is not displayed on the setting screen.

If the communication path is not secure, the controller 100 (setting screen display unit 102) displays a random character string received from the image forming device 20 in a masked display. Here, because a display button is not displayed on the setting screen, the controller 100 (display switching controller 106) does not execute the processing that removes the masked display of the random character string.

As a result of the processing described above, as long as the communication path between the terminal device 10 and the image forming device 20 is secure, the display state of the confidential data received from the image forming device 20 can be switched by a display button included in the setting screen displayed on the display unit 120 of the terminal device 10. On the other hand, if the communication path between the terminal device 10 and the image forming device 20 is not secure, data that substitutes for the confidential data is transmitted and received. Therefore, even if a data leak occurs during communication, the confidential data itself is not leaked. Furthermore, in the terminal device 10, the display state of the data that substitutes for the confidential data is never switched. In addition, as a result of confirming the random character string being displayed in a masked display, the user is able to confirm whether or not the confidential data is stored in the image forming device 20, and the number of characters in the confidential data.

Next, the processing sequence between the terminal device 10 and the image forming device 20 in the present embodiment will be described with reference to FIG. 5 and FIG. 6.

Figure 5:
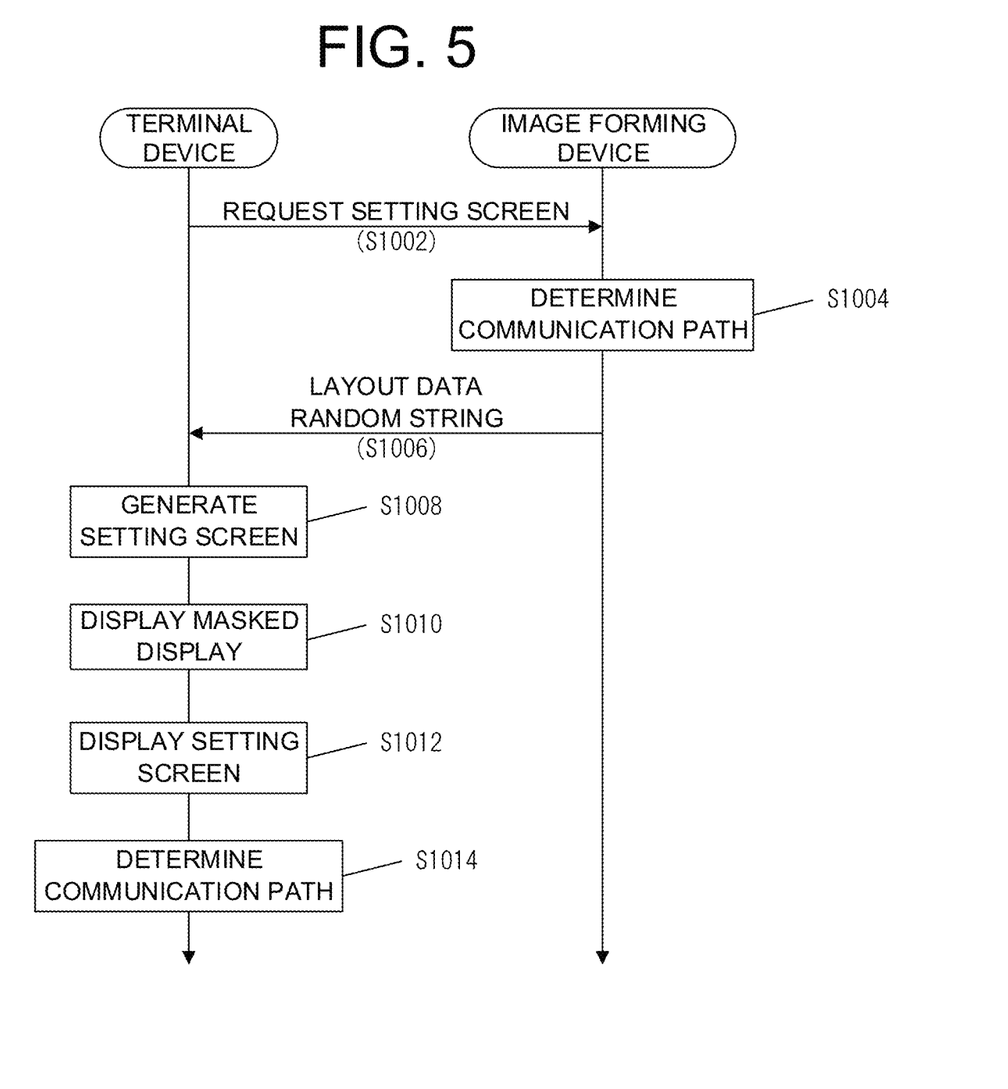
FIG. 5 is a sequence diagram for describing the flow of processing in the first embodiment.

FIG. 5 is a diagram showing the processing sequence performed by the terminal device 10 and the image forming device 20 in a case where the communication path between the terminal device 10 and the image forming device 20 is not secure, and which is executed until the setting screen is displayed on the display unit 120 of the terminal device 10.

First, the controller 100 (setting screen display unit 102) of the terminal device 10 transmits a setting screen request to the image forming device 20 (S1002). When the controller 200 (setting screen data provider 204) of the image forming device 20 receives the setting screen request, it determines whether or not the communication path used for communication with the terminal device 10 is secure (S1004). Consequently, it is determined by the controller 200 that the communication path between the terminal device 10 and the image forming device 20 is not secure.

Then, the controller 200 reads the administration data 262 and acquires the setting value data to be transmitted to the terminal device 10. Note that a portion of the setting value data is assumed to be confidential data.

Here, in S1004, it has been determined that the communication path between the terminal device 10 and the image forming device 20 is not secure. Therefore, the controller 200 (setting screen data provider 204) transmits, as setting screen data, layout data and setting value data containing random character string data to the terminal device 10 via the communication unit 250 (S1006).

Next, the controller 100 (setting screen display unit 102) of the terminal device 10 generates a setting screen based on the setting screen data (S1008). Furthermore, the controller 100 (setting screen display unit 102) displays the setting value data that has been input or displayed in the display element which displays the confidential data in a masked display (S1010), and displays the setting screen on the display unit 120 (S1012). As a result, the random character string received as data that substitutes for the confidential data is displayed in a masked display.

Then, the controller 100 (determiner 104) of the terminal device 10 determines whether or not the communication path is secure (S1014). Consequently, it is determined by the controller 100 (determiner 104) that the communication path between the terminal device 10 and the image forming device 20 is not secure. In this case, because the controller 100 (display switching controller 106) skips the processing that displays a display button, a display button is not displayed on the setting screen.

Figure 6:
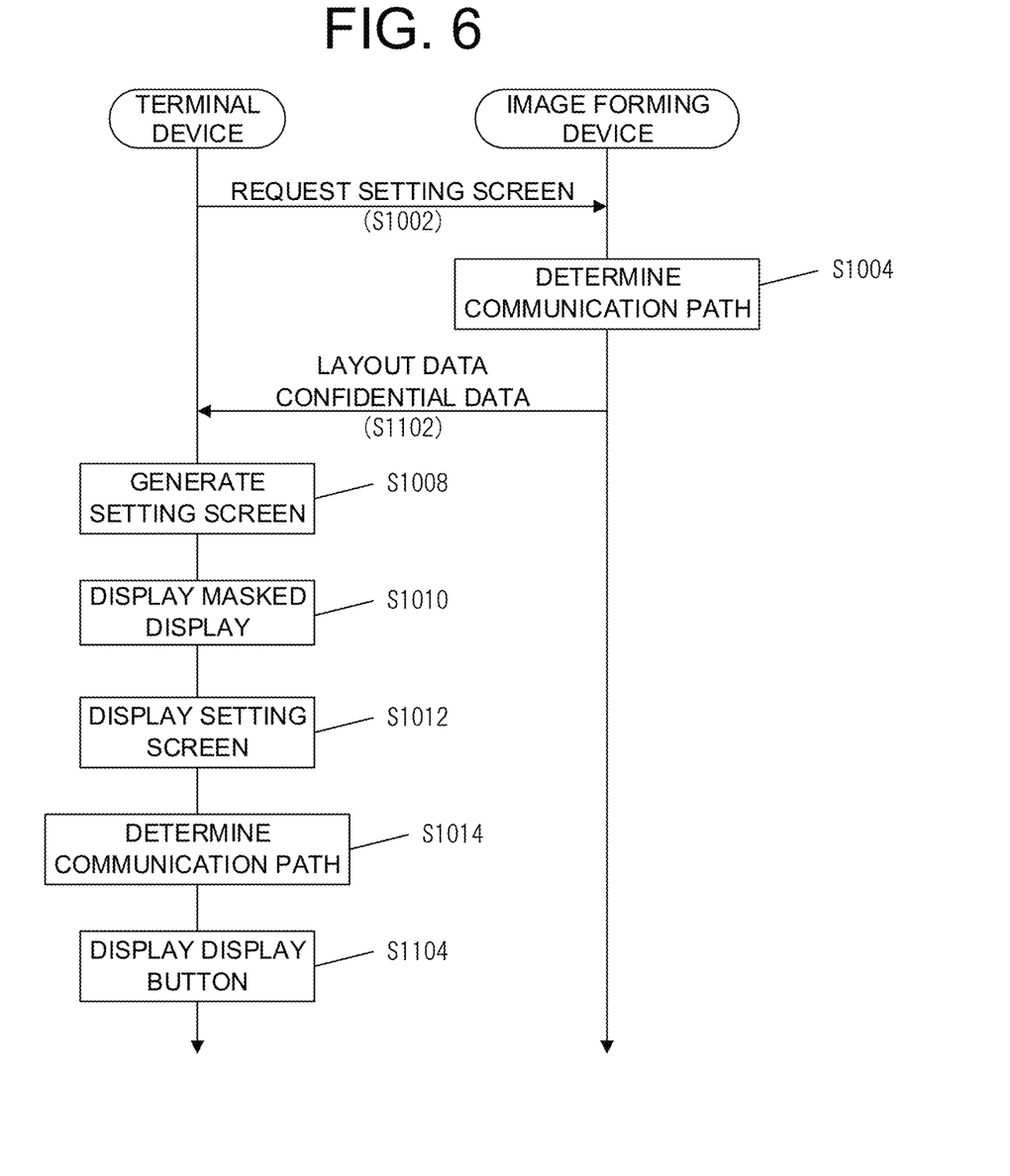
FIG. 6 is a sequence diagram for describing the flow of processing in the first embodiment.

FIG. 6 is a diagram showing the processing sequence performed by the terminal device 10 and the image forming device 20 in a case where the communication path between the terminal device 10 and the image forming device 20 is secure, and which is executed until the setting screen is displayed on the display unit 120 of the terminal device 10.

First, the controller 100 (setting screen display unit 102) of the terminal device 10 transmits a setting screen request to the image forming device 20 (S1002). When the controller 200 (setting screen data provider 204) of the image forming device 20 receives the setting screen request, it determines whether or not the communication path between the terminal device 10 and the image forming device 20 is secure (S1004). Consequently, it is determined by the controller 200 that the communication path between the terminal device 10 and the image forming device 20 is secure.

Then, the controller 200 reads the administration data 262 and acquires the setting value data to be transmitted to the terminal device 10. Note that a portion of the setting value data is assumed to be confidential data.

Here, in S1004, it has been determined that the communication path between the terminal device 10 and the image forming device 20 is secure. Therefore, the controller 200 (setting screen data provider 204) transmits, as setting screen data, layout data and setting value data containing confidential data to the terminal device 10 via the communication unit 250 (S1102).

Next, the controller 100 (setting screen display unit 102) of the terminal device 10 executes the processing from S1008 to S1012 in FIG. 5. As a result, the confidential data is displayed in a masked display. Furthermore, the controller 100 (determiner 104) determines whether or not the communication path is secure (S1014). Consequently, it is determined by the controller 100 (determiner 104) that the communication path between the terminal device 10 and the image forming device 20 is secure.

Then, the controller 100 (display switching controller 106) displays a display button on the setting screen (S1104). As a result, a display button is displayed on the setting screen when the communication path between the terminal device 10 and the image forming device 20 is secure.

1.4 Operation Example

Figure 7:
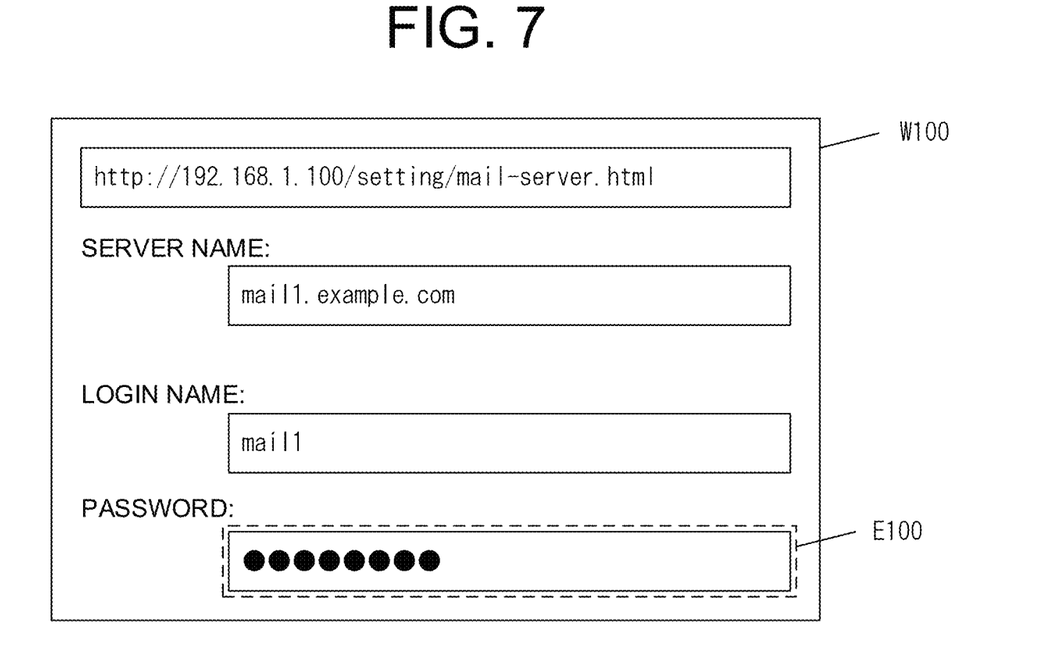
FIG. 7 is a diagram showing an operation example of the first embodiment.

Next, an operation example of the present embodiment will be described with reference to the drawings. FIG. 7 is a display example of a setting screen W100 displayed on the display unit 120 of the terminal device 10 when the communication path between the terminal device 10 and the image forming device 20 is not encrypted. The setting screen W100 is a display example of a setting screen of a mail server to which the image forming device 20 connects. It includes the server name of the mail server, and display elements for inputting a login name and a password used to log into the mail server. The display element for inputting the password is displayed as an input field E100.

If the password for logging into the mail server is confidential data, the input field E100 in FIG. 7 displays a random character string instead of the confidential data in a masked display. Here, the setting screen W100 does not include a display button for visualizing the data that has been input to the input field E100. Therefore, the user is unable to observe the data that has been input to the input field E100.

Figure 8A:
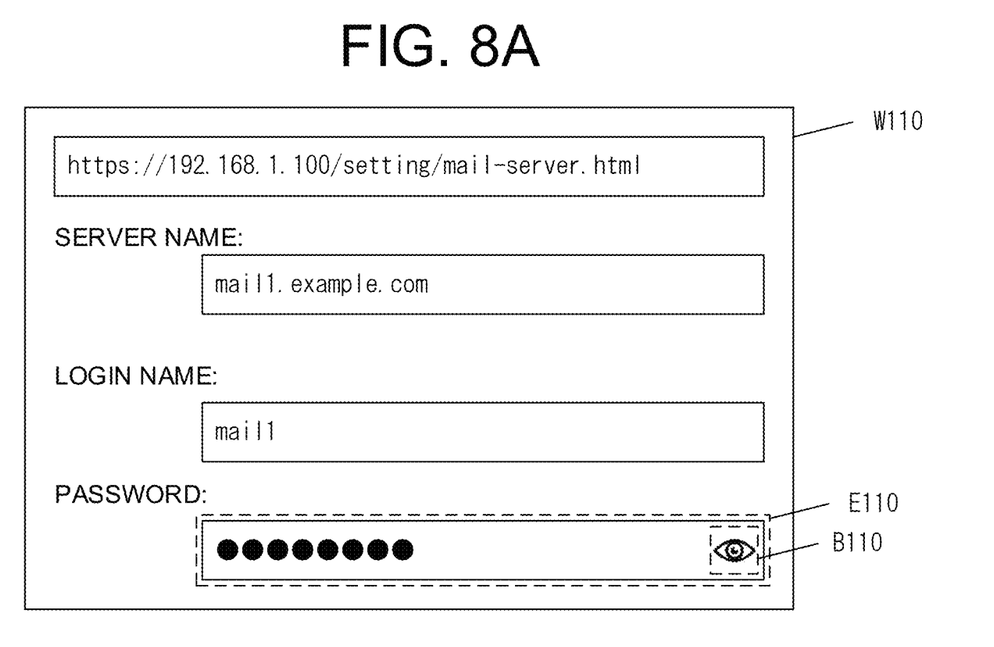
FIGS. 8A and 8B are a diagram showing an operation example of the first embodiment.
Figure 8B:
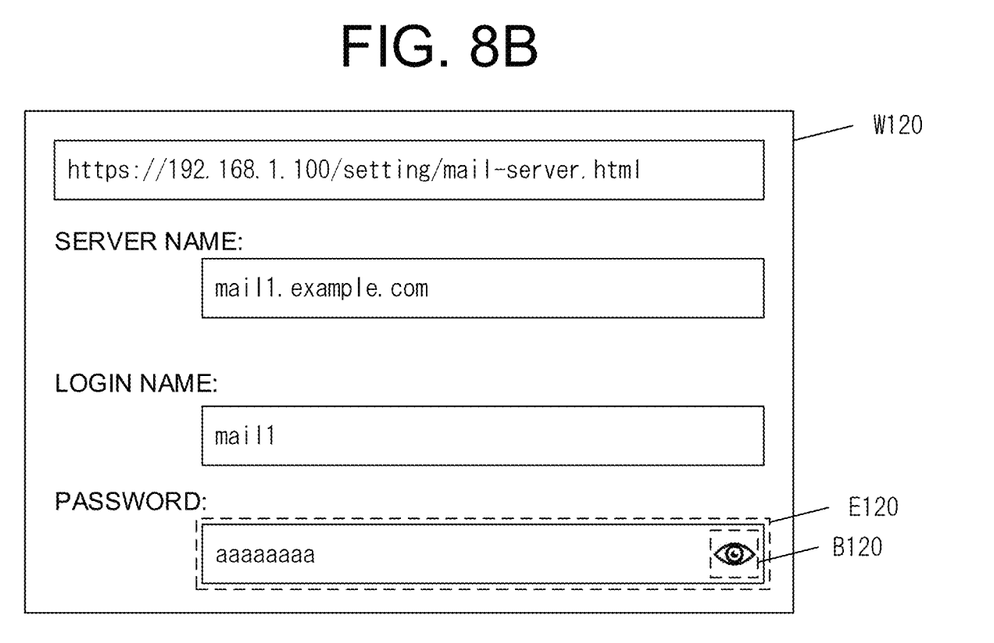

FIGS. 8A and 8B are a display example of a setting screen displayed on the display unit 120 of the terminal device 10 when the communication path between the terminal device 10 and the image forming device 20 is encrypted. Like the setting screen W100 shown in FIG. 7, the setting screen W110 is a display example of a setting screen of a mail server to which the image forming device 20 connects, and is displayed when the password for logging into the mail server is confidential data.

FIG. 8A is a display example of the setting screen W110 at the point where the setting screen W110 is first displayed on the display unit 120. The setting screen W110 includes an input field E110, which is a display element for inputting a password. At the point where the setting screen W110 is first displayed on the display unit 120, the password is displayed in a masked display.

The setting screen W110 includes a display button B110. When the display button B110 is selected by the user, the display unit 120 displays the setting screen W120 shown in FIG. 8B on the display unit 120. The setting screen W120 includes an input field E120, which is a display element for inputting a password. The input field E120 displays the password as is.

As a result, the user is able to observe the contents of the password by selecting the display button. Note that, when the selection of the display button B120 included on the setting screen W120 is released by the user, the setting screen W110 shown in FIG. 8A is displayed on the display unit 120. In this way, the display state of the password is switched each time the display button is selected, such that the password is displayed in a masked display or displayed as is.

When confidential data is not stored in the image forming device 20, nothing is displayed in the input field E100 of the setting screen W100 shown in FIG. 7, and in the input fields E110 and E120 of the setting screen shown in FIGS. 8A and 8B. In this case, the user is capable of observing that confidential data has not been stored in the image forming device 20.

In the present embodiment, a setting screen for inputting and displaying mail server information has been described as an example. However, the technique described in the present embodiment may be applied to a setting screen for inputting and displaying information other than mail server information. Furthermore, the technique described in the present embodiment may be applied to a screen other than a setting screen, such as a login screen. That is to say, the technique described in the present embodiment can be applied when a screen for inputting or displaying confidential data is displayed.

Moreover, in the present embodiment, the device that communicates with the terminal device 10 may be a device other than the image forming device 20. The device that communicates with the terminal device 10 may be an information processing device that provides a predetermined service, such as a server device, or another terminal device.

In addition, in the present embodiment, it has been described that a random character string constituted by the same number of characters as the confidential data is transmitted and received when the communication path between the terminal device 10 and the image forming device 20 is not secure. However, other data may be transmitted. For example, when the communication path between the terminal device 10 and the image forming device 20 is not secure, the number of characters constituting the confidential data may be transmitted and received from the image forming device 20 to the terminal device 10. In this case, the controller 100 (setting screen display unit 102) of the terminal device 10 may display mask characters equivalent to the received number of characters in the display element displaying the confidential data.

Further, in order to improve security, when the communication path between the terminal device 10 and the image forming device 20 is not secure, a number of characters that does not match the number of characters of the confidential data, or a random character string constituted by a number of characters that does not match the number of characters of the confidential data may be transmitted and received. As a result, even if the data communicated between the terminal device 10 and the image forming device 20 is intercepted, the number of characters of the confidential data is not leaked. When the communication path between the terminal device 10 and the image forming device 20 is not secure, flag data indicating whether or not the confidential data has been stored in the image forming device 20 may be transmitted and received. If the controller 100 (setting screen display unit 102) receives flag data indicating that the confidential data has been stored, by displaying a predetermined masked display, the user can be made to confirm whether or not the confidential data has been stored in the image forming device 20.

According to the present embodiment, if an HTTPS protocol is not being used (TLS encryption is not being applied) as the communication path between the terminal device 10 and the image forming device 20, data that substitutes for the confidential data is transmitted and received. Therefore, according to a system of the present embodiment, it is possible to prevent the confidential data from being leaked as plain text due to the communication path being intercepted. On the other hand, by transmitting and receiving data that substitutes for the confidential data, according to the system of the present embodiment, the user can be made to observe whether or not the confidential data has been set in the image forming device.

Furthermore, according to the system of the present embodiment, if an HTTPS protocol is being used (TLS encryption is being applied) as the communication path between the terminal device 10 and the image forming device 20, the confidential data transmitted and received via the communication path can be displayed.

As described above, according to the present embodiment, when displaying a screen in which confidential data, such as a password that has been set (or input) in the image forming device, can be confirmed on a terminal device capable of communicating with the image forming device, the user can be made to confirm the confidential data after the safety has been ensured such that the confidential data is not leaked from the communication path.

2. Second Embodiment

Next, a second embodiment will be described. The second embodiment is an embodiment in which it is determined whether or not the communication path is secure based on the encryption strength of the communication path.

In the present embodiment, the terminal device 10 and the image forming device 20 share a threshold for determining that the communication path is secure.

In the present embodiment, in S1004 in FIG. 5 and FIG. 6, the controller 200 (setting screen data provider 204) determines that the communication path is not secure when the encryption strength of the communication path is less than a predetermined threshold. In this case, the controller 200 (setting screen data provider 204) does not transmit confidential data to the terminal device 10, and transmits data that substitutes for the confidential data.

On the other hand, the controller 200 (setting screen data provider 204) determines that the communication path is secure when the encryption strength of the communication path is greater than or equal to the predetermined threshold. In this case, the controller 200 (setting screen data provider 204) transmits confidential data to the terminal device 10.

Figure 4:
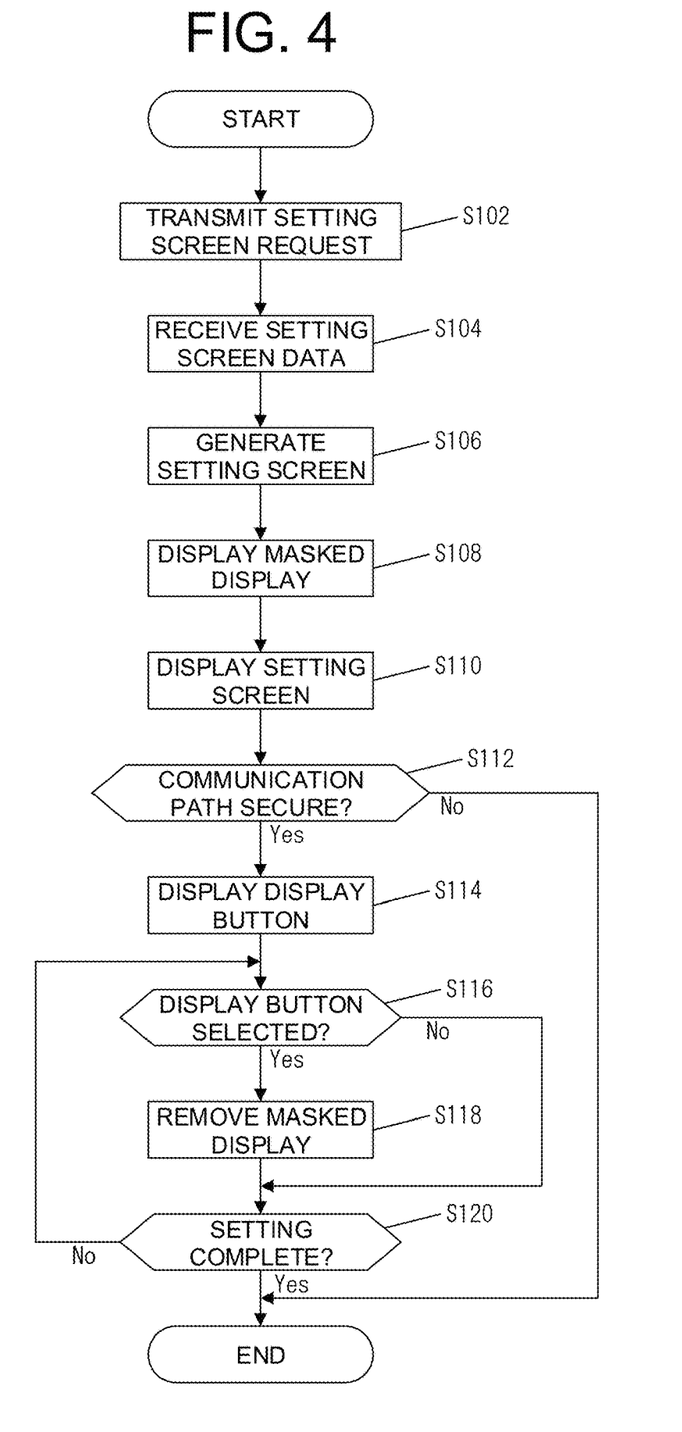
FIG. 4 is a flow diagram for describing the flow of main processing performed in a terminal device in the first embodiment.

Furthermore, in the present embodiment, in step S112 in FIG. 4 and in S1014 in FIG. 5 and FIG. 6, the controller 100 (determiner 104) determines that the communication path is not secure when the encryption strength of the communication path is less than the predetermined threshold. In this case, the controller 100 (display switching controller 106) does not display a display button on the setting screen.

On the other hand, the controller 100 (determiner 104) determines that the communication path is secure when the encryption strength of the communication path is greater than or equal to the predetermined threshold. In this case, the controller 100 (display switching controller 106) displays a display button on the setting screen.

The encryption strength of the communication path may be determined based on the type and version of the protocol used for performing communication. Furthermore, the threshold used for determining whether or not the communication path is secure is set and changed by the administrator of the image forming device 20 or the like. By making the threshold changeable in this way, an increase in the risk of decryption of confidential data due to improvements in computing power can be handled by raising the threshold.

As described above, according to the present embodiment, a display button can be prevented from being displayed when the encryption strength at the time of communication is weak. As a result, because confidential data is transmitted and received only when the encryption strength is strong, the risk of decryption of intercepted encrypted data can be reduced.

Moreover, according to the present embodiment, it is possible to change the threshold for determining whether or not the communication path is secure. Therefore, an increase in the risk of decryption of intercepted encrypted data due to improvements in computing power can be handled by raising the threshold.

In particular, the image forming device has a setting to switch secure communication such as SSL (Secure Sockets Layer)/TLS between enabled/disabled modes. Further, when secure communication is disabled, there is danger that data may be transmitted as plain text between the image forming device and the terminal device, resulting in the password being leaked to a malicious person. In addition, the strength of the encryption set used for secure communication between the image forming device and the terminal device is determined by mutual negotiation. Therefore, when an old terminal device is used and the like, a weak encryption set that is easy to decrypt may be selected for secure communication between the image forming device and the terminal device. According to the present embodiment, when a weak encryption set is selected, confidential data such as a password can be prevented from being leaked by not transmitting, receiving, and visualizing confidential data such as a password. On the other hand, when a strong encryption set is selected for secure communication between the image forming device and the terminal device, the user can be made to confirm the input contents when confidential data such as a password is input.

3. Third Embodiment

Next, a third embodiment will be described. The third embodiment is an embodiment in which the communication path between the terminal device 10 and the image forming device 20 is secure, and the image forming device 20 determines whether or not to permit the displaying of confidential data when confidential data is transmitted from the image forming device 20 to the terminal device 10. The third embodiment replaces FIG. 6 of the first embodiment with FIG. 9. Further, the same reference numerals are given to the same functional units and processing, and the description will be omitted.

Figure 9:
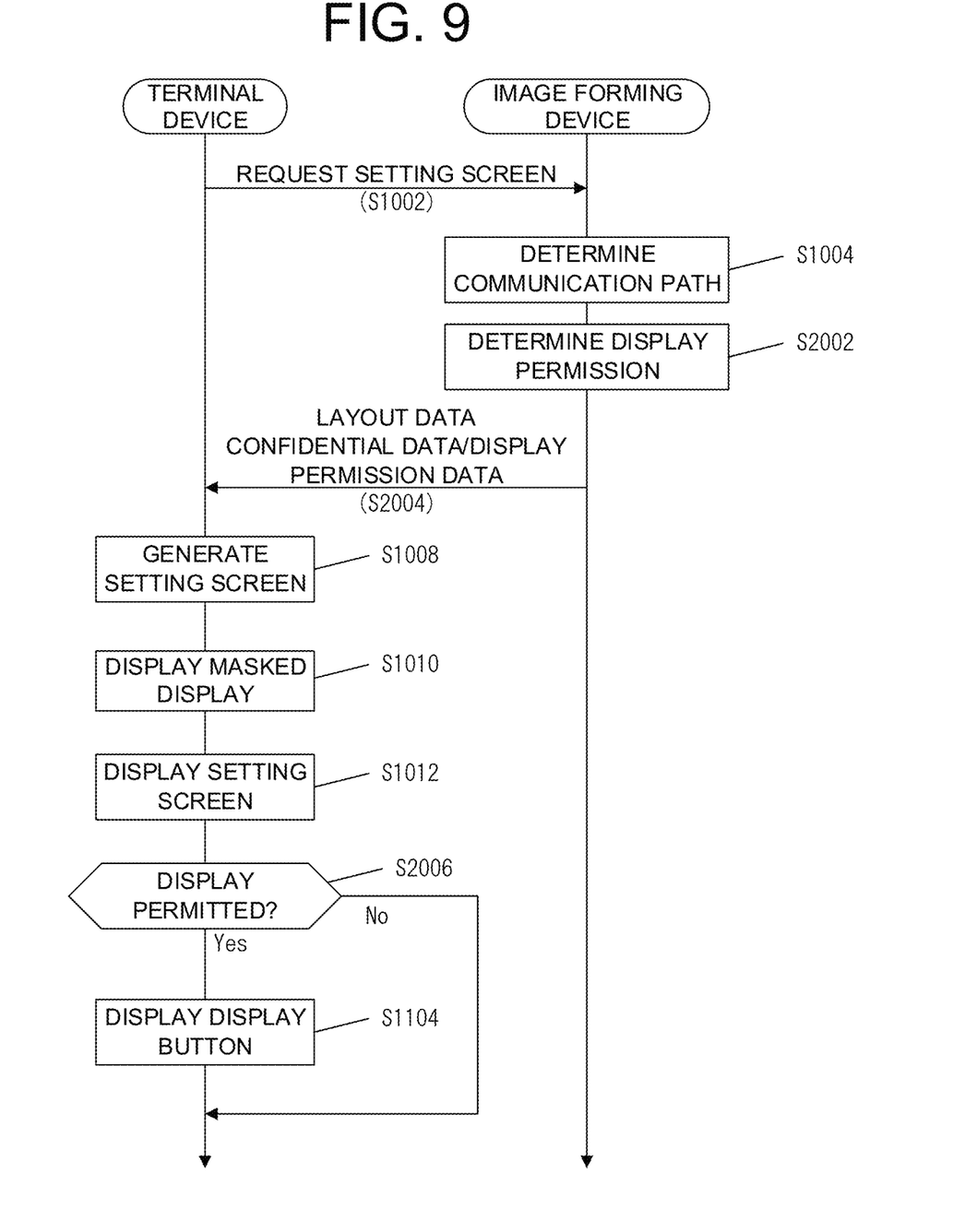
FIG. 9 is a sequence diagram for describing the flow of processing in a second embodiment.

FIG. 9 is a diagram showing the processing sequence performed by the terminal device 10 and the image forming device 20 in a case where the communication path between the terminal device 10 and the image forming device 20 is secure, and which is executed until the setting screen is displayed on the display unit 120 of the terminal device 10.

In the present embodiment, after the controller 200 (setting screen data provider 204) has determined in S1004 that the communication path between the terminal device 10 and the image forming device 20 is secure, it further determines whether or not to permit the displaying of confidential data on the terminal device 10 (S2002). For example, the controller 200 (setting screen data provider 204) determines whether or not the displaying of confidential data is permitted as follows.

(1) Determination Method Based on User Attribute

The controller 200 (setting screen data provider 204) determines whether or not the displaying of confidential data is permitted based on a user-related attribute, such as the permissions provided to the user who is using the terminal device 10, the position title of the user, and the affiliation of the user. For example, the controller 200 (setting screen data provider 204) does not permit the displaying of confidential data if the user who is using the terminal device 10 does not have administrator privileges for the image forming device 20. On the other hand, the controller 200 (setting screen data provider 204) permits the displaying of confidential data if the user who is using the terminal device 10 has administrator privileges for the image forming device 20.

(2) Determination Method Based on Terminal Device 10

The controller 200 (setting screen data provider 204) determines whether or not the displaying of confidential data is permitted based on transmission source information or attributes of the terminal device 10 that transmitted the setting screen request. For example, the controller 200 (setting screen data provider 204) permits the displaying of confidential data if the terminal device 10 that transmitted the setting screen request belongs to a specific group (domain) or network. On the other hand, the controller 200 (setting screen data provider 204) does not permit the displaying of confidential data if the terminal device 10 that transmitted the setting screen request does not belong to a specific group.

(3) Determination Method Based on Setting of Image Forming Device 20

When a setting is stored in the image forming device 20 that indicates whether or not the displaying of confidential data is permitted, the controller 200 (setting screen data provider 204) determines whether or not the displaying of confidential data is permitted based on the setting. For example, when a setting exists in the image forming device 20 that indicates the displaying of confidential data is permitted, the controller 200 (setting screen data provider 204) permits the displaying of confidential data. On the other hand, when a setting exists that indicates the displaying of confidential data is not permitted, the controller 200 (setting screen data provider 204) does not permit the displaying of confidential data.

Next, the controller 200 (setting screen data provider 204) transmits layout data, confidential data, and data indicating the display permission determined in S2002 (for example, flag data) to the terminal device 10 (S2004).

Furthermore, the controller 100 (display switching controller 106) determines whether or not to display a display button based on the data indicating the display permission received from the image forming device 20 (S2006). In step S2004, if data is received that indicates that the displaying of confidential data is permitted, the controller 100 (display switching controller 106) displays a display button on the setting screen (S2006; Yes→S1104). On the other hand, in step S2004, if data is received that indicates that the displaying of confidential data is not permitted, the controller 100 (display switching controller 106) skips (omits) the processing of S1104 (S2006; No). In this case, a display button is not displayed on the setting screen.

In the present embodiment, which is the third embodiment, if the communication path between the terminal device 10 and the image forming device 20 is not secure, the terminal device 10 and the image forming device 20 may execute the processing shown in FIG. 5 of the first embodiment.

According to the present embodiment, it is possible to switch the display permission of confidential data based on information such as the user of the terminal device, and the attributes of the terminal device. As a result, when the communication path is secure, it is possible to prevent confidential data from becoming leaked, for example, to a user that does not have administrative privileges.

4. Fourth Embodiment

Next, a fourth embodiment will be described. The fourth embodiment is an embodiment in which the communication path between the terminal device 10 and the image forming device 20 is secure, and the terminal device 10 determines whether or not to permit the displaying of confidential data based on a usage status when confidential data is transmitted from the image forming device 20 to the terminal device 10. The fourth embodiment replaces FIG. 6 of the first embodiment with FIG. 10. Further, the same reference numerals are given to the same functional units and processing, and the description will be omitted.

Figure 10:
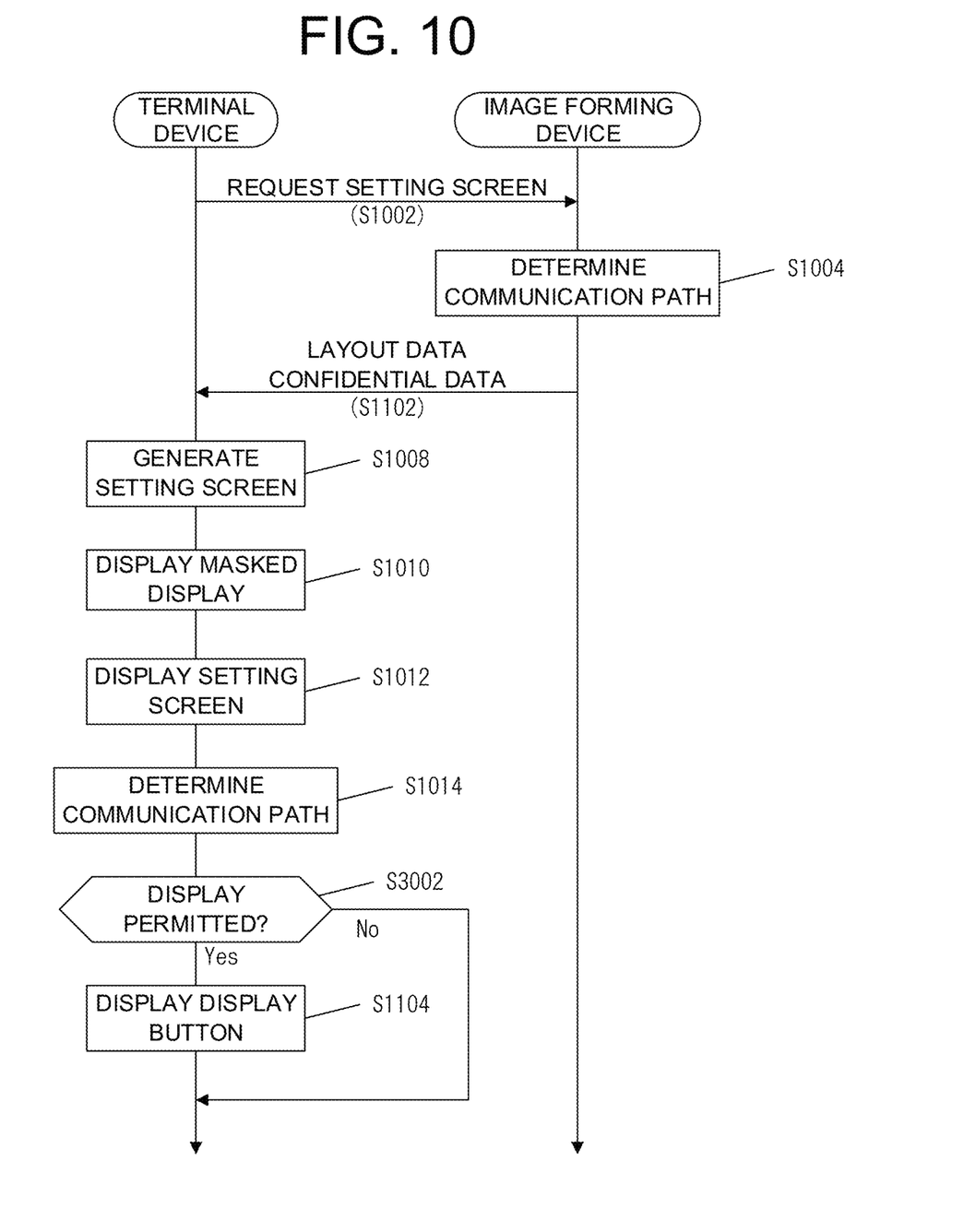
FIG. 10 is a sequence diagram for describing the flow of processing in a third embodiment.

FIG. 10 is a diagram showing the processing sequence performed by the terminal device 10 and the image forming device 20 in a case where the communication path between the terminal device 10 and the image forming device 20 is secure, and which is executed until the setting screen is displayed on the display unit 120 of the terminal device 10.

In the present embodiment, as shown in FIG. 10, the terminal device 10 and the image forming device 20 execute the processing from S1002 to S1014.

Then, the controller 100 (determiner 104) of the terminal device 10 determines whether or not the displaying of confidential data is permitted based on a usage status (S3002). The usage status is, for example, a status such as a user attribute, a group or network to which the terminal device 10 belongs, or the status of a setting of the terminal device 10.

Specifically, like S2002 of the third embodiment, the controller 100 (determiner 104) permits the displaying of confidential data if the user who is using the terminal device 10 has administrator privileges, and does not permit the displaying of confidential data if the user does not have administrator privileges. Furthermore, the controller 100 (determiner 104) may determine whether or not the displaying of confidential data is permitted based on whether or not the connected network belongs to a specific domain or network. Moreover, the controller 100 (determiner 104) may determine whether or not the displaying of confidential data is permitted based on the contents of a setting stored in the terminal device 10 (such as flag data indicating a display permission for confidential data).

If the displaying of confidential data is permitted, the controller 100 (display switching controller 106) displays a display button on the setting screen (S3002; Yes→S1104). On the other hand, if the displaying of confidential data is not permitted, the controller 100 (display switching controller 106) skips (omits) the processing of S1104 (S3002; No). As a result, a display button is not displayed on the setting screen.

As a result of the processing described above, the terminal device 10 enables the permission to display confidential data to be switched even when confidential data has been received from image forming device 20.

According to the present embodiment, the terminal device is capable of flexibly setting the display permission of confidential data based on the usage status of the terminal device (such as the user of the terminal device or an attribute of the terminal device), even when confidential data has been received from the image forming device.

5. Modifications

The present invention is not limited to the embodiments described above, and various changes may be made. That is to say, embodiments obtained by combining technical means that have been appropriately changed without departing from the scope of the present invention are also included in the technical scope of the present invention. Furthermore, the embodiments described above have portions described separately for convenience of description. It is needless to say that they may be combined within a technically possible range.

Furthermore, in the embodiments, the program that operates in each device is a program that controls a CPU or the like (a program that causes a computer to function) so as to realize the functions of the embodiments described above. Further, the information handled by these devices is temporarily stored in a temporary storage device (such as a RAM) at the time of processing, and subsequently stored in storage devices such as various ROMs (Read Only Memory) and HDDs. Then, the information is read, corrected, and written as necessary by the CPU.

Here, the recording medium that stores the program may be any of a semiconductor medium (such as a ROM or a non-volatile memory card), an optical recording medium or magneto-optical recording medium (such as a DVD (Digital Versatile Disc), an MO (Magneto Optical Disc), an MD (Mini Disc), a CD (Compact Disc), or a BD (Blu-ray (registered trademark) Disc), a magnetic recording medium (such as a magnetic tape or a flexible disk), and the like. Furthermore, in addition to loading and executing the program to realize the functions of the embodiments described above, the functions of the present invention can, in some cases, be realized by joint processing with an operating system or other application programs based on the instructions from the program.

When distributed in the market, the program can be stored and distributed in a portable recording medium, or transferred to a server computer connected via a network such as the Internet. In this case, it is needless to say that the storage device of the server computer is included in the present invention.

What is claimed is:

1. An information processing device including:
a communication device that transmits and receives data via a communication path;
a display device; and
a controller, wherein
the controller
generates a masked display on the display device based on the data received via the communication device,
displays a display button on the display device when the communication path is a secure communication path,
removes the masked display of the data and displays the data on the display device when the display button is selected, and
the controller does not display the display button on the display device when the data is received via a communication path which is not secure.

2. The information processing device according to claim 1, wherein
the controller displays substitute data to the data on the display device when the data is received via a communication path which is not secure.

3. The information processing device according to claim 1, wherein
the controller determines whether or not a communication path is secure based on an encryption strength of a communication path connected to the communication device, and
the encryption strength is a type or a version of a protocol used for performing communication.

4. The information processing device according to claim 1, wherein
the communication device further receives data indicating whether or not displaying of the data is permitted, and
the controller displays the display button on the display device when the data is received via a secure communication path, and when data is received which indicates that displaying of the data is permitted.

5. The information processing device according to claim 1, wherein
the controller displays the display button on the display device when the data is received via a secure communication path, and displaying of the data is permitted according to a usage status of the information processing device.

6. The information processing device according to claim 5, wherein
the usage status is a user attribute.

7. A control method of an information processing device including a communication device that transmits and receives data via a communication path, and a display device, the method comprising:
generating a masked display on the display device based on the data received via the communication device;
displaying a display button on the display device when the communication path is a secure communication path;
removing the masked display of the data and displaying the data on the display device when the display button is selected; and
not displaying the display button on the display device when the communication path is a communication path which is not secure.

8. A non-transitory recording medium storing a program that causes a computer of an information processing device including a communication device that transmits and receives data via a communication path, and a display device, to:
generate a masked display on the display device based on the data received via the communication device;
display a display button on the display device when the communication path is a secure communication path;
remove the masked display of the data and display the data on the display device when the display button is selected; and
not display the display button on the display device when the communication path is a communication path which is not secure.

* * * * *